United States Patent Office 2,939,730
Patented June 7, 1960

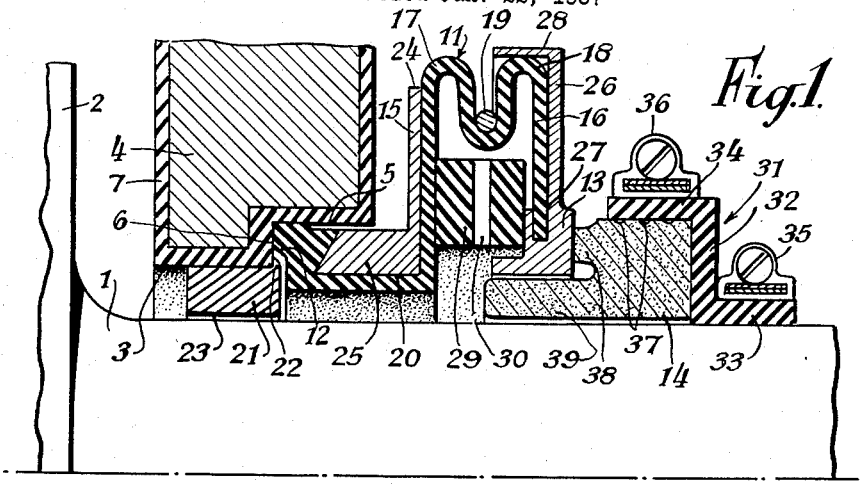

2,939,730
SEALING DEVICES FOR ROTATING MEMBERS

Geoffrey Edgar Turpin, Sketty, Swansea, Wales, assignor to The Steel Company of Wales Limited, Glamorgan, Wales Filed Jan. 22, 1957, Ser. No. 635,366

Claims priority, application Great Britain Oct. 12, 1956

8 Claims. (Cl. 286—11)

This invention relates to sealing devices for rotary members such as shafts, and particularly to devices for sealing the openings in walls, partitions or other barriers, through which rotating members extend, to prevent the passage of fluid under pressure therethrough.

It is an object of the invention to provide an improved seal which is extremely flexible and is unaffected by relatively large movements of the shafts in axial or radial directions.

It is a particular object of the invention to provide a seal applicable for use with a rotating shaft extending through the wall of a tank containing liquids of a highly corrosive or sedimental nature. In such an arrangement it is important that few parts are in contact with the liquid and that escape of the liquid is prevented along the shaft. The seal of the present invention is designed to meet these requirements and the invention further provides a sealing device whose operation depends upon the hydrostatic pressure available from the liquid in the associated tank.

A still further object of the invention is to provide a sealing device for use with corrosive liquids, the sealing device comprising parts which can be easily made of corrosion-resistant materials.

According to one aspect of the invention a device for sealing an opening in a wall and the like through which a rotary member extends, to prevent leakage of a fluid under pressure having access to one side of said wall, comprising a first sealing member engageable with said wall, a non-rotary second sealing member, a third sealing member in the form of a rubbing collar engageable with said second sealing member and secured in a fluid-tight manner to said rotary member, an expansible annular bellows surrounding said rotary member on the side of said wall remote from said fluid, the bellows having radial end walls integrally connected at their outer edges to a flexible external wall, at least one of said radial end walls being movable axially of said rotary member, and means for admitting said fluid to said bellows to act on said movable radial end wall to press the said sealing members into contact with one another and with other sealing surfaces.

In one embodiment of the invention there is provided a sealing member in the shape of an annular bellows one part of which engages the wall of a tank or other liquid container. The other end of the bellows engages an annular member forming the rotating part of the sealing device and secured to the rotating member.

In a second embodiment of the invention the expansible bellows forms part of the rotating portion of the sealing device and the axial movement of the end wall of the bellows is adapted to move a sealing ring into engagement with a sealing part fixed in relation to the wall of a liquid container.

In a third embodiment of the invention the expansible bellows forms part of the non-rotatable portion of the seal and the axial movement of the wall of the bellows is adapted to move a non-rotatable sealing ring into engagement with a rubbing collar forming part of the rotating portion of the sealing device.

These three embodiments of the invention will now be described with reference to the accompanying drawings in which Figures 1, 2 and 3 show axial half-sections of the sealing device according to the first, second and third embodiments, respectively.

Each of the illustrated sealing devices is described in its application to the sealing of an opening through which a shaft extends from a tank containing a corrosive liquid, the fluid pressure utilized to effect a seal being the hydrostatic pressure depending on the head of liquid in the tank above said opening.

It is to be understood that the illustrated devices may be applied to the sealing of shafts or other hollow or solid rotary bodies extending through the walls of pressure vessels or through other walls, partitions or barriers through which it is desired to prevent the flow of fluid. It is also to be understood that modifications of the arrangement and construction of the parts of the device may be made within the scope of the appended claims.

Referring generally to Figs. 1 to 3, a shaft 1, connected to an element 2 of apparatus which it is desired to rotate within a tank, extends through an opening 3 in the wall 4 of the tank. The periphery of the opening is spaced appreciably from the shaft, and an outer portion 5 of the opening is of increased diameter to afford an outwardly facing shoulder 6. The inner and outer surfaces of the tank walls and the periphery of the opening 3 have a covering 7 of hard corrosion-resistant rubber. The shaft 1 has a covering of a similar material.

Referring now to Fig. 1, the sealing device comprises generally an annular bellows 11, a sealing member 12 engageable with the tank wall 4, a second sealing member 13, and a third sealing member in the form of a rubbing collar 14 which engages the member 13, and is secured in a fluid-tight manner to the rotary shaft.

The annular bellows comprises a soft neoprene moulding having radial walls 15, 16 and a pair of external, U-shaped corrugations 17, 18 spaced apart by a wire ring 19. The wall 15 has at its inner periphery an axial flange 20 terminating in a nose which forms the aforesaid sealing member 12. The nose 12 engages the outer portion 5 of the opening and the shoulder 6. The bush 21 serves to centre the shaft 1 in the opening 3. The bush 21 has a flange 22 engaging the shoulder 6, and is made of corrosion-resistant material. A slight clearance 23 between the bush and the shaft permits liquid to pass from the tank to the interior of the bellows 11.

The wall 15 of the bellows is supported by a substantially rigid annular disc 24 having an axial flange 25 which is received in an undercut recess in the flange 20 of the bellows. The wall 16 of the bellows is supported by a substantially rigid annular disc 26, the inner periphery of the wall 16 being received in an annular groove 27 in a collar which is an enlargement of the inner periphery of the disc 26, and forms the aforesaid second sealing member 13. The disc 26 has an external axial flange 28 which embraces and supports the corrugation 18. A soft neoprene ring 29 of rectangular cross-section extends between the wall 15 and the collar 13 to prevent the bellows from collapsing inwardly. A plurality of apertures 30 permits communication between the interior of the tank and the interior of the bellows. The ring 29 may be integral with the wall 15.

The means for securing the rubbing collar 14 to the shaft consists of a ring 31 of Z-shaped cross-section, which is made of a corrosion-resistant deformable material such as neoprene, and which comprises a central annular disc portion 32 having oppositely directed axial flanges 33, 34 at its inner and outer peripheries, respectively. The flange 33 is clamped to the shaft by a band-clip 35, and the flange 34 is clamped to the rubbing collar 14 by a band-clip 36. The deformable nature of the Z-ring 31 provides a fluid-tight connection which may be enhanced by the provision of grooves 37 in the collar 14 into which the material of the flange 34 is deformed.

The rubbing collar 14 is of carbon, and has a short axial extension 38 which engages a radial face of the stationary sealing collar 13. A longer coaxial extension 39 projects with clearance within the collar 13.

In assembling the sealing device the various parts are first threaded on the shaft when there is no liquid in the tank to cause any hydrostatic pressure. Slight axial pressure is then exerted on the Z-ring 31 so as to bring all the parts into intimate contact with each other and with the wall 4 of the tank.

The band-clips are then secured and tightened up. The seal is now effective and the apertured ring 29 on the bellows fully closes the entrance to the bellows but is operative to allow the proper assembly of the parts. When the liquid is placed in the tank the liquid escapes from the tank along the shaft and into the bellows through the apertured ring. As the hydrostatic pressure builds up inside the bellows an axial pressure is exerted through the radial walls thereof so as to compress the sealing collar 13 against the rubbing collar 14 and to compress the sealing member 12 against the shoulder 6 of the tank wall. The pressure of the liquid within the axial flange 20 of the bellows acts radially to force the sealing member 12 against the wall 5 of the opening.

Referring to Fig. 2, the sealing device comprises generally an annular bellows 41, a sealing member 42 engageable with the tank wall 4, a second sealing member 43, and a third sealing member in the form of a rubbing collar 44 which engages the member 43 and is secured in a fluid-tight manner to the rotary shaft.

In this embodiment the annular bellows is included in the rotary component of the sealing device and comprises a soft neoprene moulding of U-shape in cross-section, and having radial walls 45, 46. The wall 45 has at its inner periphery an axial flange 47 which is clamped to the shaft 1 by a band-clip 48, whereby liquid is prevented from escaping from the bellows outwardly along the shaft. The wall 45 is supported by a substantially rigid annular disc 49, the inner periphery of which is received in a groove 50 in the flange 47. An axial extension 51 projects from the wall 45 towards the wall 46 to prevent collapse of the bellows. A plurality of radial grooves 52 is provided in the end face of the extension 51, in order that communication between the tank and the interior of the bellows may be maintained, if the extension should come into contact with the wall 46, for example, when the bellows is subjected to manual pressure during assembly of the sealing device on the shaft.

The annular wall 46 has intermediate of its width an external axial flange 53, and has a slight clearance 54 between its inner periphery and the shaft. The wall 46 is supported by a substantially rigid annular disc 55, the inner periphery of which is received in a groove 56 in the flange 53. The rubbing collar 44 fits within the flange 53 and is secured therein by a band-clip 57. The collar 44 is of carbon and has peripheral sealing grooves 58 and an axial extension 59 adapted to engage a radial face 60 of the stationary sealing member 43.

The sealing member 43 comprises a sleeve of corrosion-resistant material which fits within the enlarged portion 5 of the opening. The sleeve has a reduced tapered extension 61 which is connected by a steeper conical surface 62 to the cylindrical outer surface 63. A clearance 64 between the sleeve and the shaft permits the passage of liquid from the tank to the bellows. The sealing member 42 comprises a neoprene O ring which is disposed at the juncture of the conical surfaces 61, 62 of the sleeve and which is forced by the hydrostatic pressure in the bellows and by the wedging action of the said surfaces into sealing contact with the shoulder 6 and the surface 5 of the opening.

The second embodiment functions in a similar manner to the first embodiment and is assembled, as before, by threading the component parts on the shaft in their proper order, applying manual pressure to the outermost component, and tightening the band-clips.

Referring to Fig. 3, the sealing device comprises generally an annular bellows 71, a sealing member 72 engageable with the tank wall 4, a second sealing member 73, and a third sealing member in the form of a rubbing collar 74 which engages the member 73 and is secured in a fluid-tight manner to the rotary shaft.

The annular bellows comprises a soft neoprene moulding of U-shape in cross section, and having radial walls 75, 76. The wall 75 has at its inner periphery an axial flange 77, and is supported by a substantially rigid annular disc 78, the inner periphery of which is received in a groove 79 in the flange 77. The flange has a conical mouth 80, whereby it is formed with a wedge-shaped nose which constitutes the aforesaid sealing member 72. A sleeve 81, of corrosion-resistant material, is of externally stepped formation so as closely to engage the opening 3 in the wall 4, the enlarged outer part 5 of the opening, and the shoulder 6. The sleeve has an external conical surface 82 which forms with the opening surface 5 a recess into which the sealing nose 72 is adapted to be forced by liquid pressure acting on the bellows wall 75. A clearance 83 between the sleeve and the shaft permits the access of liquid to the bellows.

The annular wall 76 has at its inner periphery an annular boss 84, extending towards the wall 75 to prevent collapse of the bellows, and provided with radial grooves 85 to ensure access of liquid to the interior of the bellows. The wall 76 is supported by a substantially rigid disc 86, the inner periphery of which is received in a groove 87 in an axially extending flange 88. A carbon ring or collar comprising the aforesaid second sealing member 73 is located within a stepped bore of the annular flange 88, and is secured therein by a band-clip 89.

The sealing ring 73 has a reduced extension 90 engaging a radial face of the rubbing collar 74 which is of corrosion-resistant material and is secured to the shaft in a fluid-tight manner by a Z-section ring 91 of a deformable corrosion-resistant material. The ring 91 comprises a radial portion 92 and oppositely directed cylindrical portions 93, 94 which are clamped on to the rubbing collar 74 and shaft 1, respectively, by band-clips 95, 96. A reduced extension 97 of the rubbing collar 74 projects within the stationary sealing ring 73. The rings 73, 74 and 91 may be provided with grooves 98 to improve their sealing qualities.

The sealing device comprises the third embodiment of the invention, is assembled and functions in a similar manner to the first and second embodiments.

The sealing devices according to the invention are extremely efficient in use and due to the absence of springs and like parts are most suitable for use with corrosive fluids as all the parts which come in contact therewith can be made of corrosion-resistant materials. It is to be understood that the term "corrosion-resistant material" is used herein to denote a material resisting the action of a corrosive fluid which is present in the particular apparatus to which the sealing device is to be applied, and that such materials will be chosen according to their suitability in relation to a particular corrosive fluid. The component parts are also extremely flexible and their flexibility together with the action of the fluid pressure in the bellows will accommodate relatively large movements of the shaft in axial or radial directions as well as distortion of the walls of the tank.

We claim:
1. A device for sealing an opening in a wall and the like through which a rotary member extends, to prevent leakage of a fluid under pressure having access to one side of said wall, comprising a plurality of sealing members, an expansible annular bellows surrounding said rotary member on the side of said wall remote from said fluid, the bellows having radial end walls integrally connected at their outer edges to a flexible external wall, at least one of said radial end walls being movable axially of said rotary member, the said opening and the said rotary member having such relative dimensions as to provide a clearance between them through which said fluid is admitted to the said bellows to act on said movable radial end wall to press the said sealing members into contact with one another, the movement of said radial end wall being effected solely by the pressure of said fluid, a substantially rigid annular disc supporting each of said radial end walls and secured at its inner periphery to said bellows, and a radially apertured ring extending from one of said radial end walls towards said other radial end wall to prevent collapse of said bellows and to ensure permanent access of said fluid to the interior of said bellows.

2. A device for sealing an opening in a wall and the like through which a rotary member extends, to prevent leakage of a fluid under pressure having access to one side of said wall, comprising a first sealing member engageable with said wall, a non-rotary second sealing member, a third sealing member in the form of a rubbing collar engageable with said second sealing member and secured in a fluid-tight manner to said rotary member, an expansible annular bellows surrounding said rotary member on the side of said wall remote from said fluid, the bellows having radial end walls integrally connected at their outer edges to a flexible external wall, at least one of said radial end walls being movable axially of said rotary member, means for admitting said fluid to said bellows to act on said movable radial end wall to press the said sealing members into contact with one another and a radially apertured ring extending from one of said radial end walls towards said other radial end wall to prevent collapse of said bellows and to ensure permanent access of said fluid to the interior of said bellows.

3. A sealing device according to claim 2, including a substantially rigid annular disc supporting each of said radial end walls and secured at its inner periphery to said bellows.

4. A sealing device according to claim 2, wherein said first sealing member comprises an integral axial flange of one of said radial end walls which is adapted to engage a shoulder in the said opening.

5. A sealing device according to claim 2, wherein said first sealing member comprises an integral axial flange of one of said radial end walls which is adapted to engage a shoulder in the said opening, the inner periphery of one of said supporting discs being engaged in an undercut recess in said flange, and wherein said second sealing member comprises an integral collar formed at the inner periphery of the other of said supporting discs.

6. A sealing device according to claim 2, wherein said rubbing collar is secured to said rotary member by a ring of deformable material having a radial disc-like central portion and oppositely extending cylindrical portions which embrace the rubbing collar and rotary member respectively, and are clamped thereto by band-clips.

7. A sealing device according to claim 2, wherein said second sealing member comprises a sleeve disposed at one end of the rubbing collar, said sleeve at its end remote from said rubbing collar having a reduced tapered extension which joins a steeper conical surface of said sleeve, an O ring constituting said first sealing member being disposed at this juncture, whereby the wedging action of said tapered extension and conical surface force said O ring into sealing contact with the peripheral surface of said opening and with a shoulder in said opening.

8. A sealing device according to claim 2, wherein said first sealing member comprises an axial flange of one of said radial end walls, said flange having a conical mouth so as to form a wedge-shaped nose adapted to be received in an annular recess formed between said opening and the conical end of a sleeve of externally stepped formation fitting within said opening and against a shoulder therein, said second sealing member comprising a ring secured within a recess in an axial extension of said bellows by a band-clip on said extension.

References Cited in the file of this patent

UNITED STATES PATENTS

| | | |
|---|---|---|
| 2,407,218 | Beier | Sept. 10, 1946 |
| 2,426,047 | Payne | Aug. 19, 1947 |
| 2,443,145 | Payne | June 8, 1948 |
| 2,574,808 | Wolfe | Nov. 13, 1951 |
| 2,707,118 | Swartz et al. | Apr. 26, 1955 |
| 2,740,648 | Amblard | Apr. 3, 1956 |
| 2,758,856 | Payne et al. | Aug. 14, 1956 |
| 2,765,186 | Wright | Oct. 2, 1956 |